Figure 1:
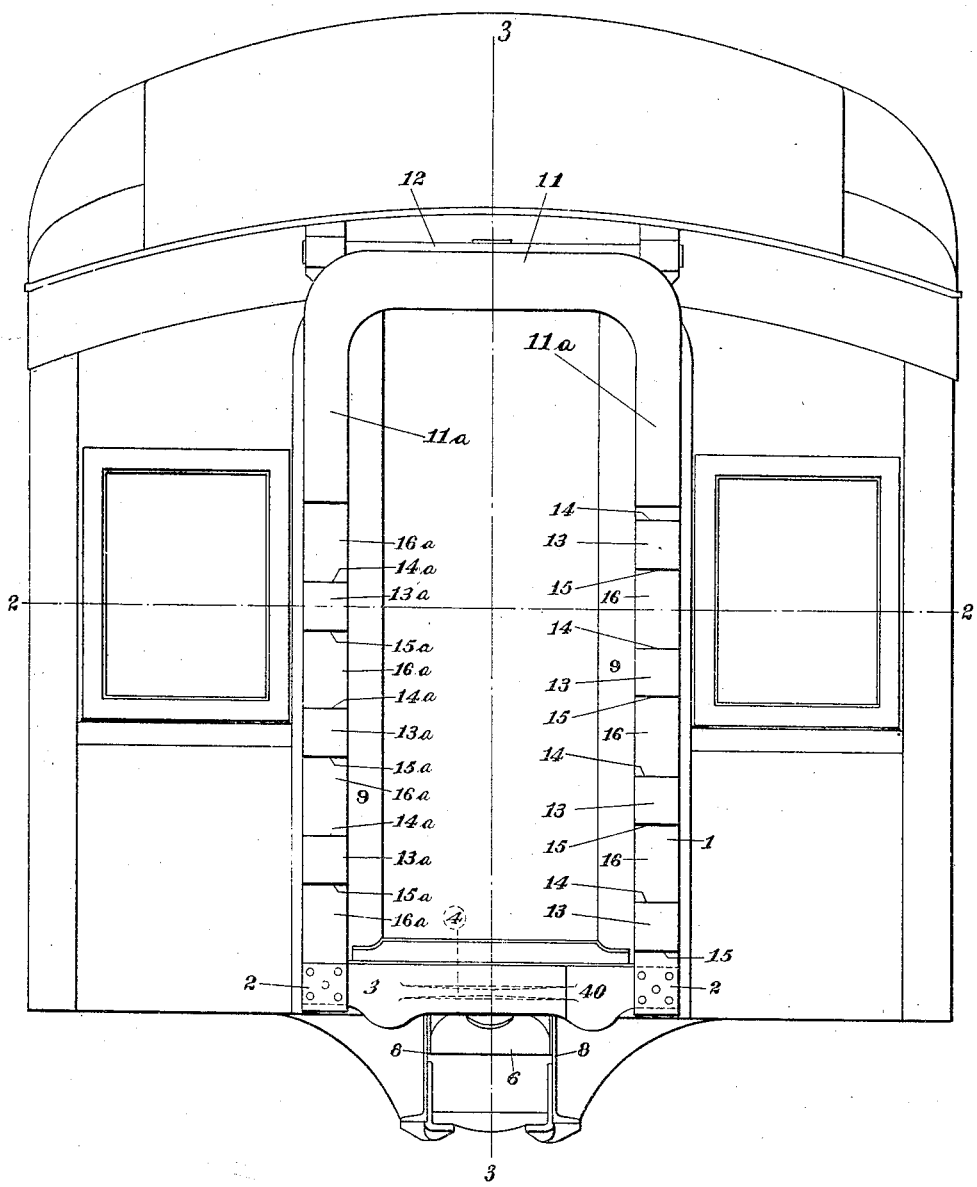

C. A. LINDSTRÖM.
ANTICLIMBER FOR PASSENGER CARS.
APPLICATION FILED APR. 4, 1912

1,097,655.

Patented May 26, 1914.
5 SHEETS—SHEET 2.

Witnesses
Frank E. Miller
Margaret H. Summerhill

Inventor
Charles Lindström

C. A. LINDSTRÖM.
ANTICLIMBER FOR PASSENGER CARS.
APPLICATION FILED APR. 4, 1912.
1,097,655.
Patented May 26, 1914.
5 SHEETS—SHEET 4.
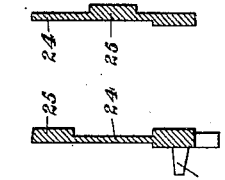
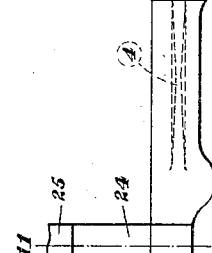
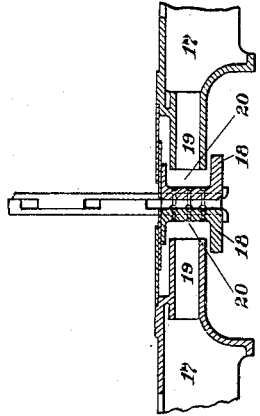
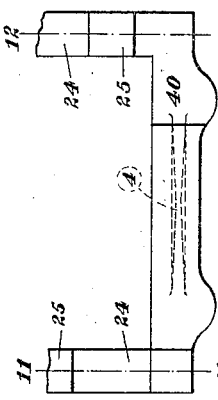
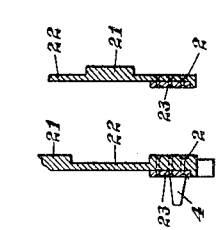
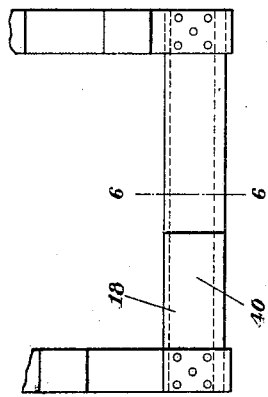
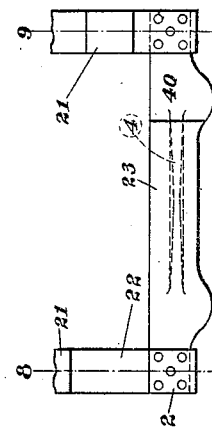
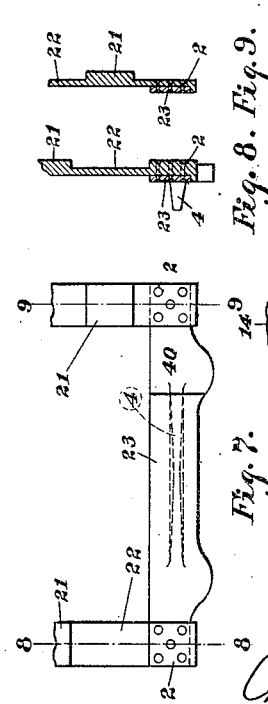

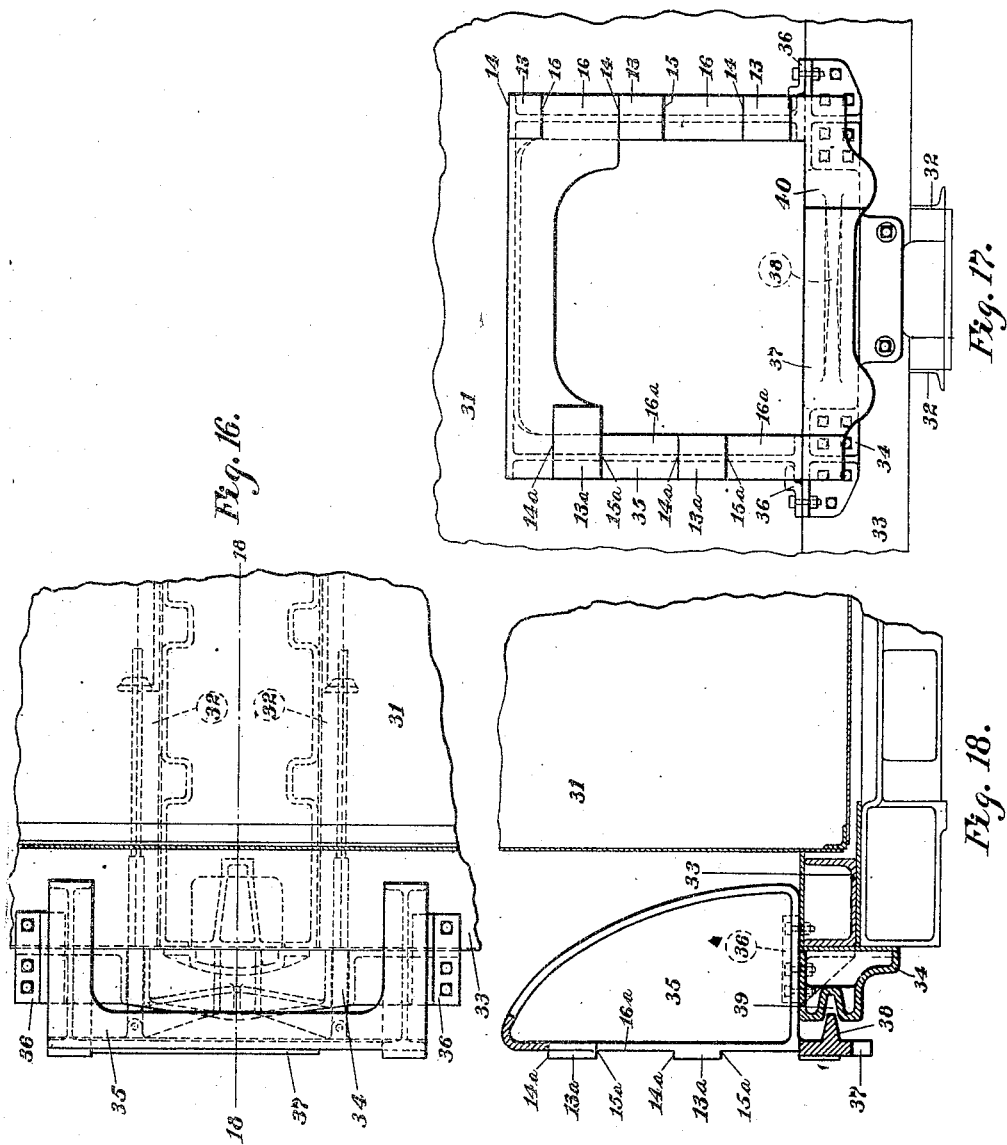

UNITED STATES PATENT OFFICE.

CHARLES A. LINDSTRÖM, OF PITTSBURGH, PENNSYLVANIA.

ANTICLIMBER FOR PASSENGER-CARS.

1,097,655. Specification of Letters Patent. Patented May 26, 1914.

Application filed April 4, 1912. Serial No. 688,535.

*To all whom it may concern:*

Be it known that I, CHARLES A. LINDSTRÖM, a citizen of the United States, residing at No. 138 Stratford avenue, Pittsburgh, in the county of Allegheny and State of Pennsylvania, have invented certain new and useful Improvements in Anticlimbers for Passenger-Cars, of which the following is a full, clear, and exact description, such as will enable others skilled in the art to which it pertains to make and use the same, reference being had to the accompanying drawings, forming part of this specification.

My invention relates to devices, commonly known as anti-climbers for preventing cars from climbing over each other in collisions or similar accidents, and particularly to cars of the types equipped with vestibules and diaphragms, to which earlier devices of this class cannot be readily applied in an effective manner, if at all.

It is well known that in the event of a collision between cars or trains traveling at great speed, there exists a tendency of the cars to mount over each other which causes the heavy underframe of one car to shear off and destroy the relatively light posts and braces forming the superstructure or body proper of the other car, thus causing a greater amount of damage and destruction of the cars, as well as frequently a greater loss of life, than would be the case if this climbing or mounting of the cars were prevented.

Heretofore two distinctive methods have been proposed and used to some extent, namely, first to provide the ends of the underframes of the cars with mechanical devices arranged to engage the next car, but the means used did not permit the free movement of the cars up and down or sidewise relative to each other, and were, therefore, impracticable; and second, to provide means at the ends of the underframes so arranged that free movement was obtained, but the device was so arranged that the parts intended to interlock and prevent climbing of the cars did not come into interlocking position with each other until forced into such position by great force, as in a collision; but collisions have demonstrated that such devices sometimes fail to operate as intended and are, therefore, not absolutely safe.

The main object of my invention is therefore to provide a device which will prevent cars from climbing over each other and at the same time eliminate any objections which may exist to earlier devices.

A further object of my invention is to provide a device which can be readily applied to existing car constructions without the necessity of making expensive changes thereto.

A further object of my invention is to provide an anti-climbing device having interlocking parts placed at the ends of the cars, and so arranged that these parts on adjacent cars when coupled together are interlocked with each other under normal service conditions, whether the cars are standing still or in motion.

A further object of my invention is to provide a device with interlocking parts, so arranged that a limited difference in height of car platform, due to worn wheels, axles, journals, bearings or low springs, etc., which may make a difference in height between two cars to be coupled together, is compensated for, so as to facilitate coupling and allow for the required clearance when running over rough tracks and around curves.

A further object of my invention is to provide a device of this class having large bearing surfaces so that the faces of the interlocking parts may be in constant contact with each other without becoming useless from rapid wear.

A further object of my invention is to provide interlocking surfaces or parts so arranged that the protruding or male surfaces on the end of one car may come opposite and engage with the depressed or female surfaces on the adjacent car, no matter which end of the cars are coupled together.

A further object of my invention is to provide interlocking parts so arranged that cars equipped with such parts can readily be coupled to cars not so equipped, and so facilitate interchange of cars, etc.

The invention consists substantially in the construction, combination, location and relative arrangement of parts, all as will be more fully hereinafter set forth and shown in the accompanying drawings, and finally pointed out in the appended claims.

Figure 2:
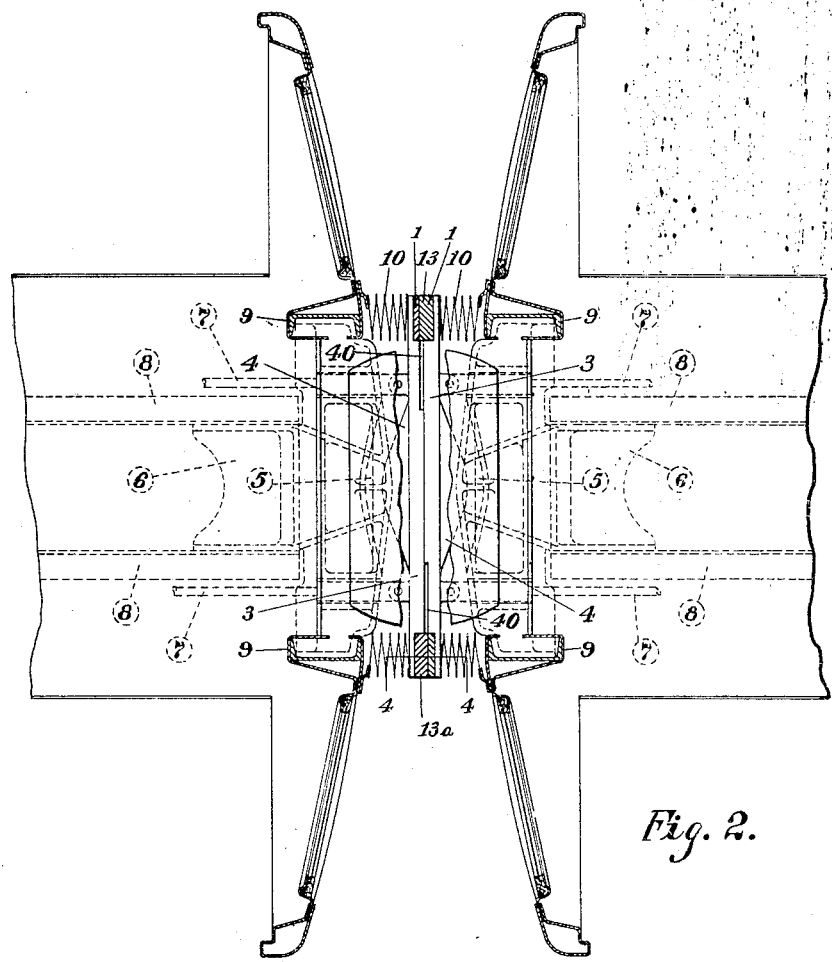
Figure 4:
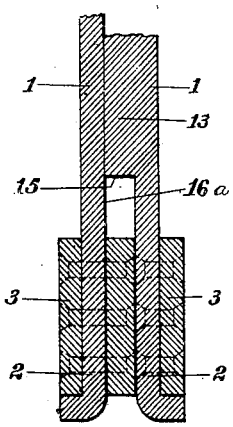
Figure 3:
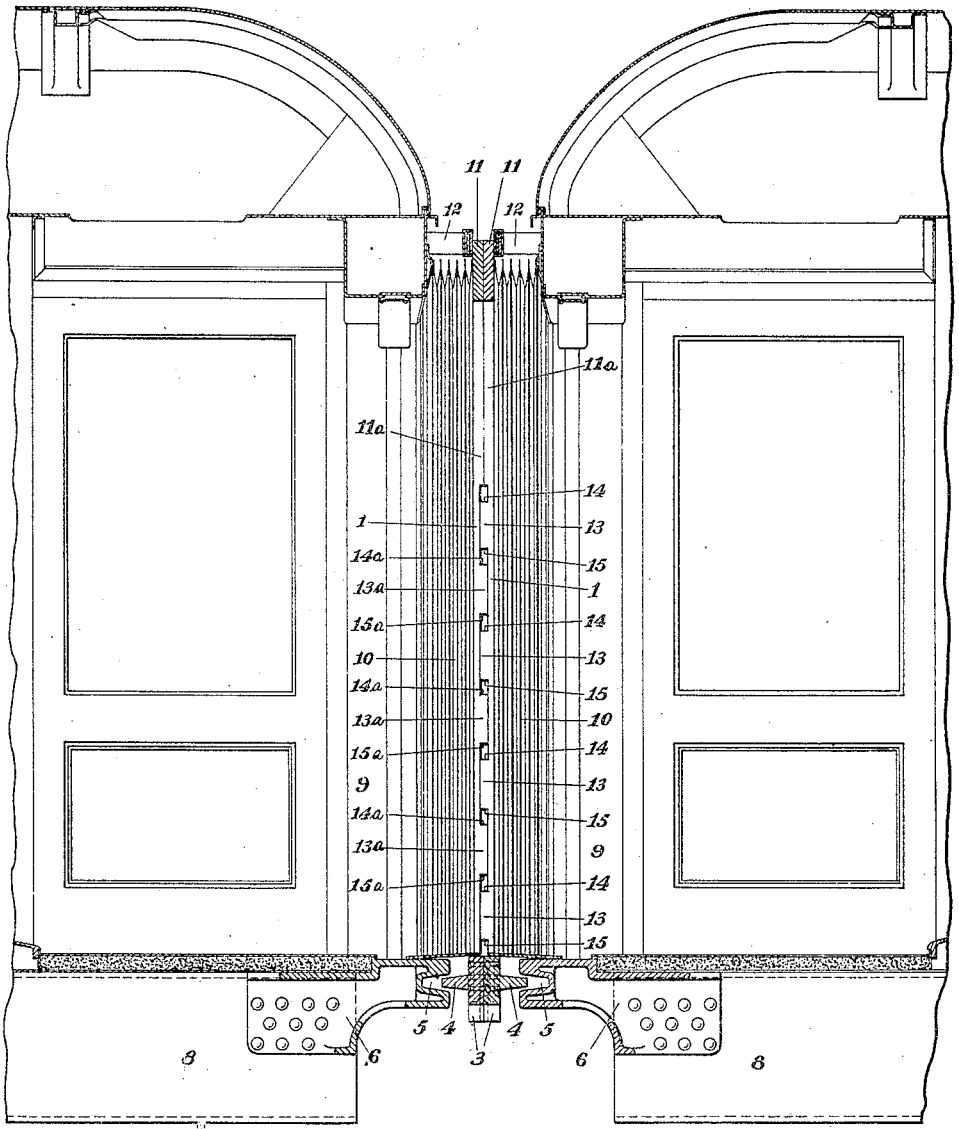

Referring to the accompanying drawings, in which similar reference characters refer to similar parts throughout the several views: Figure 1 shows an end elevation of the end portion of a car constructed in accordance with my invention. Fig. 2 shows a horizontal section on line 2—2 of Fig. 1. Fig. 3 shows a vertical section of two cars coupled together taken on line 3—3 of Fig. 1. Fig. 4 is an enlarged vertical section taken on line 4—4 of Fig. 2. Fig. 5 shows an end elevation of a modification of my invention. Fig. 6 shows a vertical section taken on line 6—6 of Fig. 5. Fig. 7 shows an elevation of another modification of my invention, and Figs. 8 and 9 show vertical sections taken on lines 8—8 and 9—9 respectively of Fig. 7. Fig. 10 shows an end elevation of a further modification of my invention, and Figs. 11 and 12 show vertical sections taken on lines 11—11 and 12—12 respectively of Fig. 10. Fig. 13 shows still another modification of my invention, and Figs. 14 and 15 show vertical sections taken on lines 14—14 and 15—15 respectively of Fig. 13. Fig. 16 shows a plan view of a modification of the invention adapted for application to a locomotive tender. Fig. 17 shows an end elevation of Fig. 16 and Fig. 18 shows a sectional elevation taken on line 18—18 of Fig. 16.

Referring now in detail to the drawings, in which similar reference characters indicate similar parts in the several figures thereof, 1 indicates the frame plates projecting from the ends of the cars, made of metal of rectangular or any other suitable uniform or variable section which will provide the necessary strength and rigidity therein, and having the general size and contour of the doorways in the ends of the cars, and formed in substantially inverted U shape. These frame plates are secured at the bottom ends 2, to the end portions of combined buffer and guide members 3, having projecting portions 4, adapted to engage with recesses 5, formed in the end platform members 6, the projecting portions of the members 3, and the recesses 5 in the members 6, being formed in such a manner as to limit the vertical movement of the member 3 relative to the member 6, and preventing the frame plate 1 from rising or falling more than a pre-determined distance relative to the end of the car of which it forms a part. The combined buffer and guide members 3 are actuated to normally project, as shown in Fig. 2, by means of coiled springs (not shown) carried by the guide bars 7 which work loosely through holes in the end platform members 6.

8 indicates the outer end portions of the center sills of the car to which the end platform members 6 are secured, such center sills, as well as the other portions of the underframe being of any suitable construction.

The frame plates 1 may be connected at their tops and sides to the vestibule end posts 9, by means of the usual flexible bellows 10. The upper portions 11 of the frame plates 1 are connected with the end plate of the vestibule and supported in a vertical position by means of springs which may either extend transversely of the car as 12, or be made of helical form and extend lengthwise of the car, as often used, and these in conjunction with the aforementioned springs actuating the combined buffer and guide member 3, serves to keep the frame plate of one car in close contact with the frame plate of the adjacent car when they are coupled together.

The above parts are not new in my invention, but are essential to it in some form, and are therefore described in order to make clear the operation of my invention hereinafter described.

To prevent the frame plate 1, of one car from rising more than a prescribed distance above its normal position relative to the frame plate of the adjacent car, I provide the outer face of the frame plates with projections 13 and 13$^a$, which extend substantially across the width of each leg of the frame plate 1, and project outwardly from the face of the frame plate a sufficient distance to secure an interlocking engagement with similar projections on the frame plate of the adjacent car. When there is any tendency, through collisions or otherwise, of one frame plate to rise more than the prescribed amount, the upper edges 14 of the projections on the frame plate on the one car will engage with the lower edges 15$^a$ of the projections 13$^a$ on the frame plate of the adjacent car, and also the lower edges 15 will engage with the upper edges 14$^a$ of the projections 13$^a$, on the frame plate of the adjacent car, and thus prevent one car from climbing over the other, whereby the main object of my invention is obtained. These projections are spaced, as shown in Fig. 1, so that those on one leg of the frame plate do not correspond in vertical location with those on the other or opposite leg of the same frame plate, the center line of one projection taken on the horizontal plane substantially corresponding with the similar center line of the space between two projections on the opposite leg of the frame plate, thus enabling two cars equipped with my invention to be coupled together with the aforementioned projections in operative engagement in the event of one or both of the cars being turned end for end, or reversed in their relative positions to each other.

To permit of a certain amount of vertical movement due to unevenness of the track or other causes, the projections 13 and 13$^a$ are so spaced on the legs of the frame plate that the vertical spaces 16 and 16$^a$ between them, is greater than the vertical height of the parts 13 and 13$^a$, so that there is a vertical clearance space between the upper edge 14 of one of the projections 13, and the lower edge 15$^a$ of the projections 13$^a$ above it on the frame plate of the adjacent car, and also a vertical clearance space between the lower edge 15 of the part 13 and the upper edge 14$^a$ of the projections 13$^a$ of the adjacent car.

Figs. 5 and 6 show a modified form 17 of the end platform member, and combined buffer and guide member 18, in which a projecting portion 19 of the platform member is adapted to engage with a recess 20, in the combined buffer and guide member, used on some cars, and is shown in the drawings to show the adaptation of my invention thereto.

Figs. 7, 8 and 9 show a modified form of my invention in which the projecting portions 21 on the frame plate 22, are shown integral therewith, the lower ends of the legs of the frame plate being secured to the combined buffer and guide member 23 as above described.

Figs. 10, 11 and 12 show another modified form of my invention in which the frame plate 24, the projections 25 and the combined buffer and guide member are all made integral.

Figs. 13, 14 and 15 show still another modification of my invention, in which, in order to facilitate removal of the frame plate 26, for renewal or repairs or other causes, splices 27 are formed between the lower portions 28 of the frame plate, and the upwardly projecting portions 29 of the combined buffer and guide member 30.

All of the modifications, shown in Figs. 5 to 15 inclusive, are simply modifications in the details forming part of my invention or in the details of the car to which they are attached, and are illustrated mainly to show that various modifications can be made in these parts.

Figs. 16, 17 and 18 show a modification of my invention as adapted for application to a locomotive tender underframe, in which 31 indicates the tender tank, 32 the sills of the underframe, and 33 the end sill, to which an end platform member 34 is secured. On the end platform member and end sill a frame member 35 is slidably seated, being retained in such position by the members 36. The lower portion of the frame member 35 is provided with a combined buffer and guide portion 37, having a projecting portion 38 adapted to engage with a recess 39, formed in the end platform member 34, and operating in a manner similar to that described in connection with Figs. 1 to 4 of the drawings. The outer face of the upright portions of the frame member 35, is provided with the projections 13 and 13$^a$ suitably located and adapted to engage with the frame plate on the end of the adjacent car as hereinbefore described. While the drawings illustrating this modification of my invention show the frame member 35 as being of limited height compared with the frame member of a vestibule car, it is to be understood that it may be made of a height equal to that of the frame plate of the car, and that the upper portion of frame member 35 may be supported against the tank by suitable devices, the same as used on the upper end of frame plates on cars, if found desirable.

In the application of my invention it will be found necessary, to provide clearance spaces 40, shown in Figs. 1, 2, 5, 7, 10 and 13, in the end portions of the face of the combined buffer and guide members. These spaces are for the purpose of permitting the projecting portion of the face of the combined buffer and bearing member to pass the face of the projections 13$^a$ at the lower ends of the legs of the frame members, when the ends of the cars move sidewise relative to each other owing to side movement due to curvature of tracks and other causes.

The upper portion 11 of the frame plate 1 and its downwardly extending leg portion 11$^a$ are made of a thickness equal to the thickness of the frame plate plus half the thickness of the projections 13 or 13$^a$, thus insuring a substantially close contact of the portions 11 and 11$^a$ of one car with the corresponding portions 11 and 11$^a$ of the adjacent car, and so preserving the interchangeable feature of my invention and also maintaining the substantially weathertight joint between the upper portions of the frame plates of adjacent cars as with frame plates without my invention. The clearance spaces between the upper and lower edges of the projections 13 and 13$^a$ are covered by the adjustable vestibule shield curtains commonly used, and which requires no particular description.

It is immaterial, in the adaptation of my invention whether the frame plates are formed of corrugated metal, the corrugations forming projections of the desired size, or whether the projections are formed of separate pieces of metal and secured to the frame plate, or whether the projections are formed integral with the frame plate, so long as the said frame plates are provided with projections having interlocking edges and bearing faces that will prevent more than a limited amount of vertical movement with relation to each other, and so located that the parts are adapted to interlock with similar parts on adjacent cars, and so that the cars can be reversed or turned end for end and coupled together without defeating the object of my invention; and it is also immaterial what particular construction of springs is applied at the top of the frame plate, and what particular construction of combined buffer and guide member and end platform casting is used, so long as they are adapted to engage each other and prevent more than a limited movement of the end frame relative to the car, for my invention broadly consists in having opposing interlocking members projecting from adjacent cars, adapted to permit a limited vertical movement of the ends of the cars relative to each other, and a sidewise movement to compensate for curvature of tracks and other causes.

Having thus described my invention, what I claim as new, and desire to secure by Letters Patent, is:

1. The combination with adjacent cars of vestibule frame plates projecting therefrom, interlocking members extending uninterruptedly across the face of said frame plates adapted to limit the vertical movement of contiguous frame plates relative to each other.

2. The combination with adjacent cars of vestibule frame plates projecting therefrom, interlocking members projecting from and extending uninterruptedly across the face of said frame plates adapted to limit the vertical movement of contiguous frame plates relative to each other.

3. The combination with adjacent cars of vestibule frame plates projecting therefrom, interlocking members formed in and projecting from said frame plates, adapted to limit the vertical movement of contiguous frame plates relative to each other, said interlocking members extending uninterruptedly across the face of said plates.

4. The combination with adjacent cars of vestibule frame plates projecting therefrom, interlocking members extending uninterruptedly across the face of said frame plates, the edges of said interlocking members being adapted to engage to limit the vertical movement of contiguous frame plates relative to each other.

5. The combination with adjacent cars of vestibule frame plates projecting therefrom, interlocking members projecting from and extending uninterruptedly across the face of said frame plates, the edges of said interlocking members being adapted to engage to limit the vertical movement of contiguous frame plates relative to each other.

6. The combination with adjacent cars of vestibule frame plates projecting therefrom, interlocking members formed in and projecting from and extending uninterruptedly across the face of said frame plates, the edges of said interlocking members being adapted to engage to limit the vertical movement of contiguous frame plates relative to each other.

7. The combination with adjacent cars of vestibule frame plates projecting therefrom, said frame plates having continuous projecting and receding surfaces adapted to engage with each other to limit the vertical movement of contiguous frame plates relative to each other.

8. The combination with adjacent cars of platform members secured to the underframes of said cars, combined buffer and guide members adapted to engage said platform members, vestibule frame members on said buffer and guide members, and interlocking members extending uninterruptedly across the face of said frame members adapted to limit the vertical movement of contiguous frame members relative to each other.

9. The combination with adjacent cars of platform members secured to the underframes of said cars, combined buffer and guide members adapted to engage said platform members, vestibule frame members on said buffer and guide members, and interlocking members projecting from and extending uninterruptedly across the face of said frame members adapted to limit the vertical movement of contiguous frame members relative to each other.

10. The combination with adjacent cars of platform members secured to the underframes of said cars, combined buffer and guide members adapted to engage said platform members, vestibule frame members on said buffer and guide members, and interlocking members formed in and projecting from and extending uninterruptedly across the face of said frame members, adapted to limit the vertical movement of contiguous frame members relative to each other.

11. The combination with adjacent cars of platform members secured to the underframes of said cars, combined buffer and guide members adapted to engage said platform members, vestibule frame members on said buffer and guide members, interlocking members extending uninterruptedly across the face of said frame members, the edges of said interlocking members being adapted to engage to limit the vertical movement of contiguous frame plates relative to each other.

12. The combination with adjacent cars of platform members secured to the underframes of said cars, combined buffer and guide members adapted to engage said platform members, vestibule frame members on said buffer and guide members, interlocking members projecting from and extending uninterruptedly across the face of said frame plates, the edges of said interlocking members being adapted to engage to limit the vertical movement of contiguous frame plates relative to each other.

13. The combination with adjacent cars of platform members secured to the underframes of said cars, combined buffer and guide members adapted to engage said platform members, vestibule frame members on said buffer and guide members, interlocking members formed in and projecting from said frame members, said interlocking members extending uninterruptedly across the face of said frame members, the edges of said interlocking members being adapted to engage to limit the vertical movement of contiguous frame members relative to each other.

14. The combination with adjacent cars of platform members secured to the underframe of said cars, combined buffer and guide members adapted to engage said platform members, vestibule frame members on said buffer and guide members, said frame members having projecting and partly receding surfaces, adapted to engage with each other to limit the vertical movement of contiguous frame members relative to each other, said projecting and receding surfaces extending uninterruptedly across the face of said frame members.

15. The combination with adjacent cars of vestibule frame plates projecting therefrom, interlocking members, having spaces between them on said frame plates, said members being adapted to limit the vertical movement of contiguous frame plates relative to each other, the interlocking members on the legs of one frame plate alternating with the spaces on the other legs of the other frame plate.

16. The combination with adjacent cars of vestibule frame plates projecting therefrom, interlocking members, having spaces between them on said frame plates, the edges of said interlocking members being adapted to engage to limit the vertical movement of contiguous frame plates relative to each other, the interlocking members on the legs of one of the frame plates alternating with the interlocking members on the legs of the other frame plate.

17. The combination with adjacent cars of vestibule frame plates projecting therefrom, interlocking members, having spaces between them on said frame plates, the edges of said interlocking members being adapted to engage to limit the vertical movement of contiguous frame plates relative to each other, the interlocking members on one leg of each frame plate being opposite the open spaces on the other leg of the same frame plate.

18. The combination with adjacent cars of vestibule frame plates projecting therefrom, interlocking members having spaces between them projecting from said frame plates, the edges of said interlocking members being adapted to engage to limit the vertical movement of contiguous frame plates relative to each other, the interlocking members on the legs of one of the frame plates alternating with the interlocking members on the legs of the other frame plate.

19. The combination with adjacent cars of vestibule frame plates projecting therefrom, interlocking members, having spaces between them projecting from said frame plates, the edges of said interlocking members being adapted to engage to limit the vertical movement of contiguous frame plates relative to each other, the interlocking members on one leg of each frame plate being opposite the open spaces on the other leg of the same frame plate.

20. The combination with adjacent cars of vestibule frame plates projecting therefrom, interlocking members, having spaces between them formed in and projecting from said frame plates, the edges of said interlocking members being adapted to engage to limit the vertical movement of contiguous frame plates relative to each other, the interlocking members on the legs of one of the frame plates alternating with the interlocking members on the legs of the other frame plate.

21. The combination with adjacent cars of vestibule frame plates projecting therefrom, interlocking members, having spaces between them formed in and projecting from said frame plates, the edges of said interlocking members being adapted to engage to limit the vertical movement of contiguous frame plates relative to each other, the interlocking members on one leg of each frame plate being opposite the open spaces on the other leg of the same frame plate.

22. The combination with adjacent cars of vestibule frame plates projecting therefrom, said frame plates having projecting and receding surfaces adapted to engage with each other to limit the vertical movement of contiguous frame plates relative to each other, said projecting surfaces on the legs of one of the frame plates alternating with said projecting surfaces on the legs of the other frame plate.

23. The combination with adjacent cars of vestibule frame plates projecting therefrom, said frame plates having projecting and receding surfaces adapted to engage with each other to limit the vertical movement of contiguous frame plates relative to each other, said projecting surfaces on one leg of each frame plate being opposite the receding surfaces on the other leg of the same frame plate.

24. The combination with adjacent cars of platform members secured to the underframe of said cars, combined buffer and guide members adapted to engage said platform members, vestibule frame members on said buffer and guide members, and interlocking members, having spaces between them on said frame members adapted to limit the vertical movement of contiguous frame members relative to each other, the interlocking members on one of said frame members alternating with the interlocking members on the other of the said frame members.

25. The combination with adjacent cars of platform members secured to the underframe of said cars, combined buffer and guide members adapted to engage said platform members, vestibule frame members on said buffer and guide members, and interlocking members, having spaces between them on said frame members adapted to limit the vertical movement of contiguous frame members relative to each other, the interlocking members on one leg of each frame member being opposite the open spaces on the other leg of the same frame member.

26. The combination with adjacent cars of platform members secured to the underframes of said cars, combined buffer and guide members adapted to engage said platform members, vestibule frame members on said buffer and guide members, and interlocking members, having spaces between them projecting from said frame members adapted to limit the vertical movement of contiguous frame members relative to each other, the interlocking members on one of said frame members alternating with the interlocking members on the other of said frame members.

27. The combination with adjacent cars of platform members secured to the underframes of said cars, combined buffer and guide members adapted to engage said platform members, vestibule frame members on said buffer and guide members, and interlocking members, having spaces between them projecting from said frame members adapted to limit the vertical movement of contiguous frame members relative to each other, the interlocking members on one leg of each frame member being opposite the open spaces on the other leg of the same frame member.

28. The combination with adjacent cars of platform members secured to the underframes of said cars, combined buffer and guide members adapted to engage said platform members, vestibule frame members on said buffer and guide members, and interlocking members, having spaces between them formed in and projecting from said frame members, adapted to limit the vertical movement of contiguous frame members relative to each other, the interlocking members on the legs of one of the frame members alternating with the interlocking members on the legs of the other frame member.

29. The combination with adjacent cars of platform members secured to the underframes of said cars, combined buffer and guide members adapted to engage said platform members, vestibule frame members on said buffer and guide members, and interlocking members, having spaces between them formed in and projecting from said frame members, adapted to limit the vertical movement of contiguous frame members relative to each other, the interlocking members on one leg of each frame member being opposite the open spaces on the other leg of the same frame member.

30. The combination with adjacent cars of platform members secured to the underframe of said cars, combined buffer and guide members adapted to engage said platform members, vestibule frame members on said buffer and guide members, interlocking members, having spaces between them on said frame members, the edges of said interlocking members being adapted to engage to limit the vertical movement of contiguous frame members relative to each other, the interlocking members on the legs of one of the frame members alternating with the interlocking members on the legs of the other frame member.

31. The combination with adjacent cars of platform members secured to the underframe of said cars, combined buffer and guide members adapted to engage said platform members, vestibule frame members on said buffer and guide members, interlocking members, having spaces between them on said frame members, the edges of said interlocking members being adapted to engage to limit the vertical movement of contiguous frame members relative to each other, the interlocking members on one leg of each frame member being opposite the open spaces on the other leg of the same frame member.

32. The combination with adjacent cars of platform members secured to the underframes of said cars, combined buffer and guide members adapted to engage said platform members, vestibule frame members on said buffer and guide members, interlocking members, having spaces between them projecting from said frame plates, the edges of said interlocking members being adapted to engage to limit the vertical movement of contiguous frame members relative to each other, the interlocking members on the legs of one of the frame members alternating with the interlocking members on the legs of the other frame member.

33. The combination with adjacent cars of platform members secured to the underframes of said cars, combined buffer and guide members adapted to engage said platform members, vestibule frame members on said buffer and guide members, interlocking members, having spaces between them projecting from said frame members, the edges of said interlocking members being adapted to engage to limit the vertical movement of contiguous frame members relative to each other, the interlocking members on one leg of each frame member being opposite the open spaces on the other leg of the same frame member.

34. The combination with adjacent cars of platform members secured to the underframes of said cars, combined buffer and guide members adapted to engage said platform members, vestibule frame members on said buffer and guide members, interlocking members, having spaces between them formed in and projecting from said frame members, the edges of said interlocking members being adapted to engage to limit the vertical movement of contiguous frame members relative to each other, the interlocking members on the legs of one of the frame members alternating with the interlocking members on the legs of the other frame member.

35. The combination with adjacent cars of platform members secured to the underframes of said cars, combined buffer and guide members adapted to engage said platform members, vestibule frame members on said buffer and guide members, interlocking members, having spaces between them formed in and projecting from said frame members, the edges of said interlocking members being adapted to engage to limit the vertical movement of contiguous frame members relative to each other, the interlocking members on one leg of each frame member being opposite the open spaces on the other leg of the same frame member.

36. The combination with adjacent cars of platform members secured to the underframe of said cars, combined buffer and guide members adapted to engage said platform members, vestibule frame members on said buffer and guide members, said frame members having projecting and receding surfaces, adapted to engage with each other to limit the vertical movement of contiguous frame members relative to each other, said projecting surfaces on the legs of one of the frame members alternating with said projecting surfaces on the leg of the other frame member.

37. The combination with adjacent cars of platform members secured to the underframe of said cars, combined buffer and guide members adapted to engage said platform members, vestibule frame members on said buffer and guide members, said frame members having projecting and receding surfaces, adapted to engage with each other to limit the vertical movement of contiguous frame members relative to each other, said projecting surfaces on one leg of each frame member being opposite the receding surfaces on the other leg of the same frame member.

38. In a frame plate for a vestibule car, the combination of projecting and receding surfaces on the outer face of said frame plate, said projecting surfaces extending across the width of one leg of the frame plate alternating with the projecting surfaces on the other leg of the frame plate.

39. In a frame plate for a vestibule car, the combination of projecting and receding surfaces on the outer face of said frame plate, said projecting surfaces on one leg of the frame plate being opposite the receding surfaces on the other leg of the frame plate.

40. In a frame plate for a vestibule car, the combination of alternate projections and depressions extending across the width of the faces of the legs of said frame plate, adapted to engage with similar projections and depressions on an adjacent car.

41. In a frame plate for a vestibule car, the combination of alternate projections and depressions on said frame plate, the projections on one leg of said frame plate being opposite the depressions on the other leg of said frame plate.

42. In a frame plate for a vestibule car, the combination of alternate projections and depressions on said frame plate, the projections on one leg of said frame plate being opposite the depressions on the other leg of said frame plate, and adapted to engage with similar projections and depressions on the frame plate of the adjacent car.

43. The combination with adjacent cars of vestibule frame plates projecting therefrom, alternate projections and depressions extending across the width of the faces of the legs of one of said frame plates adapted to engage with similar projections and depressions on the face of the frame plate of the adjacent car.

44. The combination with adjacent cars of vestibule frame plates projecting therefrom and means extending across the width of the face of said plates adapted to limit the vertical movement of contiguous frame plates relative to each other.

45. In a frame plate for a vestibule car, the combination of projecting and receding surfaces on the outer face of said frame plate, and extending transversely thereof, said projecting surfaces on one leg of the frame plate alternating with said projecting surfaces on the other leg of the frame plate.

46. In a frame plate for a vestibule car, the combination of alternate projections and depressions on the legs of said frame plate and extending transversely across the width thereof, adapted to engage with similar projections and depressions on an adjacent car.

In testimony whereof I affix my signature in presence of two witnesses.

CHARLES A. LINDSTRÖM.

Witnesses:
 FRANK E. MILLER,
 MARGARET H. SUMMERBELL.